United States Patent [19]
Iversen

[11] Patent Number: 5,850,844
[45] Date of Patent: Dec. 22, 1998

[54] PRESSURE REDUCTION VALVE

[75] Inventor: Bjørn Scholz Iversen, Kongsberg, Norway

[73] Assignee: Kongsberg Automotive ASA, Kongsberg, Norway

[21] Appl. No.: 875,088

[22] PCT Filed: Feb. 1, 1996

[86] PCT No.: PCT/NO96/00023

§ 371 Date: Nov. 5, 1997

§ 102(e) Date: Nov. 5, 1997

[87] PCT Pub. No.: WO96/23996

PCT Pub. Date: Aug. 8, 1996

[30] Foreign Application Priority Data

Feb. 3, 1995 [NO] Norway .................................. 95 0409

[51] Int. Cl.⁶ .................................................. G05D 11/00
[52] U.S. Cl. .................... 137/111; 137/114; 137/115.13; 137/115.21
[58] Field of Search .................... 137/111, 114, 137/115.13, 115.21

[56] References Cited

U.S. PATENT DOCUMENTS 2,689,583  9/1954  Gardiner ........................ 137/115.13 X
2,774,369  12/1956  Di Tirro .............................. 137/111 X
4,463,775  8/1984  Wittren ................................... 137/111

*Primary Examiner*—Stephen M. Hepperle
*Attorney, Agent, or Firm*—Finnegan, Henderson, Farabow, Garrett & Dunner, L.L.P.

[57] ABSTRACT

A pressure reduction valve for reducing the pressure in double-acting, closed hydraulic systems when they are not attended. The valve comprises a valve housing (1) with a boring (6), whose ends communicate with the respective circuits, and wherein there are provided two slide valves (21, 22), which are attempted to be forced away from each other by a spring device (39). Each slide valve (21, 22) has a seat (28, 29) for a valve body (31, 32) which is influenced by springs (37, 38) which are also arranged to move the slide valves (21, 22) towards each other. Between the valve bodies (31, 32) there extends slidably a rod (40), whose ends can influence the valve bodies, and whose length is adapted to the slide valves (21, 22) possible distances of movement, thus enabling it to bring the valve bodies alternately away from their seats when the slide valves are forced towards each other under the influence of the pressures in the respective hydraulic circuits.

3 Claims, 1 Drawing Sheet

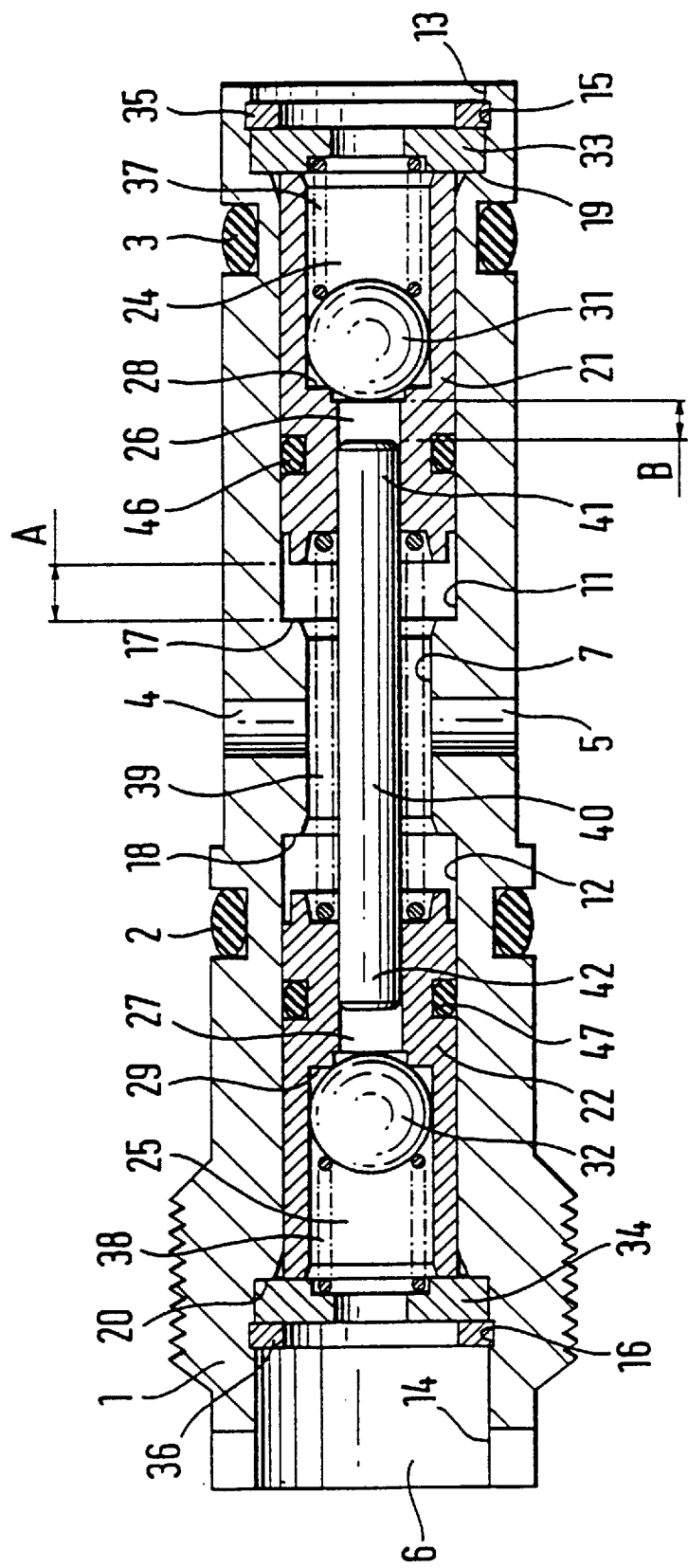

PRESSURE REDUCTION VALVE

The invention relates to a pressure reduction valve for reducing the pressure in the circuits of double-acting, closed hydraulic systems with a slave activator and a master activator, when the master activator is unattended, comprising a valve housing which contains a first seat which defines two spaces, wherein the first space is arranged to communicate with the first circuit and the second space is arranged to communicate with a reservoir for the hydraulic fluid, in the first space there is provided a first valve body and a first spring, one end of which abuts against a section of the housing and the other end of which abuts against the valve body, and the valve body is arranged to be moved in one direction to sealingly abut against the seat under the influence of the force which is exerted by the pressure of the fluid in the first circuit, and the force of the first spring, and in an opposite direction under the influence of an opening body section which in turn is influenced by the pressure of the fluid in the second circuit.

Valves of this type are employed, e.g., in connection with gear shift systems for cars, where the gear shift forces are transferred from the driver's cabin to the gear box via a hydraulic system of this type.

Since the power transfer is hereby performed without any kind of servo arrangement, i.e. the pressure which is produced in the pipes for movement of the slave activator is provided by movement of the gear lever by hand, the friction between the movable components of the system must be moderate in order that the hand power required may also be moderate.

When the system is left and the temperature in the hydraulic fluid increases, an increase takes place in the pressure of the hydraulic fluid in the system's circuits. This results in an increase in the force whereby this fluid influences the packings between the movable and stationary components of the system, and the force which must be exerted to achieve movement of these movable components, which is a disadvantage.

When a valve of this kind is employed, the valve body is lifted from its seat when the pressure exceeds a defined value for the said reason. Fluid from one circuit can thereby flow to a reservoir and the pressure of the fluid in the circuit is reduced. Since the two circuits can be separated by only a piston which is freely movable in the master cylinder, a reduction also takes place in the pressure of the fluid in the second circuit.

The force required to operate the system can therefore be maintained at a moderate level.

The valve, however, creates a flow of fluid from only one of the circuits to the reservoir. If the vehicle is left with the gear lever in its neutral position, the situation can therefore arise that the gear lever is moved away from its normal position in relation to the driver's seat, and this can be uncomfortable for the driver. A further situation which can arise is that the gear lever is moved so far away from its position in relation to the gear lever housing that the desired gear can no longer be obtained since the gear lever abuts against the gear lever housing.

The object of the invention is to provide a valve whereby the above-mentioned disadvantages are eliminated.

The characteristics of the valve according to the invention are presented in the characteristic features indicated in the claims.

The invention will now be described in more detail with reference to the drawing whose only figure schematically illustrates a longitudinal section through an embodiment of a valve according to the invention.

The valve comprises a housing 1 which is circular in cross section and on the outside of which there are formed two radially outwardly open grooves, in which there are fitted respective O-rings 2,3. The valve housing can thereby be arranged for sealing insertion in a boring, e.g. in a gear lever housing or the like, since a section of the outside of the housing can be equipped with external threads arranged to be screwed into internal threads of the boring.

Approximately at the centre of the housing 1, calculated in the housings longitudinal direction, and between the O-rings there extend two aligned, radial borings 4,5 which are arranged for connection with a reservoir for the hydraulic fluid in the double-acting hydraulic system (not shown).

Through the housing 1 and in its longitudinal direction there extends a boring 6 with a narrowed, middle or central boring section 7, in which the radial borings 4,5 are terminated.

Each end of the middle boring section 7 is connected to a first and second boring section 11 and 12 with larger diameter. Thus at the transition between these boring sections there are formed first and second shoulders 17,18.

The first and second boring sections each extends to close to its end of the housing, where they pass into third and fourth boring sections 13 and 14 respectively with increased diameter, the transition between these boring sections forming third and fourth shoulders 19,20. In the wall of the third and fourth borings 13,14 there are formed radially inwardly open ring grooves 15 and 16.

The third and fourth borings 13,14 can communicate with a first and second circuit respectively of a known per se double-acting hydraulic system which is not illustrated in more detail in the drawing.

In the first and second boring sections 11,12 there are slidably arranged respective first and second identical, external cylindrical slide valves 21,22. At the end section of the slide valves 21,22 which faces the openings of the housing's boring 6, each slide valve 21,22 has a large boring 24 and 25 respectively which at the end which faces the housing's middle section, passes into a boring 26,27 with smaller diameter, thus forming at the transition between the borings circular shoulders 28 and 29 respectively, which constitute valve seats.

In the borings 24,25 with large diameter of the slide valves 21,22 there are provided a first and second spherical valve body 31,32 respectively each of which is arranged to sealingly abut against its valve seat 28,29.

In the cylindrical outer wall of the slide valves 21,22 there are formed radially outwardly open grooves in which there are fitted O-rings 46,47 which seal between the slide valves and the boring of the housing in which the slide valves are slidingly arranged. Thus each of the slide valves is movable in its respective boring under the influence of the pressure of the fluid in the borings.

In the third and fourth borings 13,14 there are fitted respective discs 33,34 with a central, axially through-going hole, the discs abutting against the third and fourth shoulder 19,20 respectively and being secured against axial displacement by locking rings, e.g. snap rings 35,36 each of which is fitted in its ring groove 15,16.

Between the first and second valve body 31,32 and the adjacent disc 33,34 there are installed identical respective first and second compression springs 37,38, which can be in the form of helical springs, and which attempt to force each of the valve bodies 31,32 to abut against its seat 28,29. When the valve bodies abut against their seats, these springs 37,38 attempt to move the slide valves in one direction to abut against the first and second shoulder 17,18 respectively.

Between the slide valves 21,22 and through the middle section 7 of the boring 6 there extends a central, third compression spring 39 which in the same way can be in the form of a helical spring. This central compression spring 39 attempts to move the slide valves 21,22 in the opposite direction to abut against the respective discs 33,34.

Coaxially with the valve's boring 6 there extends a cylindrical rod or opening body 40 through the centre boring 7 and the central opening through the third compression spring 39 which is formed by its windings. This body's first and second end sections 41 and 42 respectively are introduced with clearance into the borings 26,27 with small diameter in the slide valves 21,22. Between the boring walls and the end sections there is thereby formed a channel with an annular cross section which connects the large boring 24,25 of the slide valves 21,22 with the radial borings 4,5 in the housing 1 when the valve bodies 31,32 are not in abutment against their seats.

The distance between the first and the third shoulder 17 and 19 which corresponds to the distance between the second and the fourth shoulder 18 and 20 is a distance A longer than the axial length of the slide valves 21,22. This distance A constitutes the possible distance of movement for each slide valve 21,22.

When the slide valves are brought into abutment against the discs 33,34 and the valve bodies 31,32 abut against the seats 28,29, the distance between the valve bodies 31,32 is a distance 2×B greater than the length of the rod 40, the rod 40 in the figure being arranged symmetrically between the slide valves.

For the valve according to the figure, where the possible distances of movement for the slide valves are equal, the following disparity applies: (2×B)>A>B.

In the case where the distances of movement of the slide valves are not equal, the more general rule applies that the total possible distance of movement for the opening body 40 between the valve bodies 31,32 in their closed state is greater than the possible distance of movement for each of the slide valves 21,22, but less than the total distance of movement for the slide valves 21,22. Thus it is ensured that the valve bodies can be moved away from their seats only when the pressure of the fluid in both circuits exceeds defined limiting values simultaneously. The valve therefore does not open when there is an increase in pressure in only one of the circuits.

The function of the valve according to the invention is as follows.

When the double-acting hydraulic system is operated in such a manner that, e.g., the pressure is increased in the second circuit, i.e. the circuit which can be connected to the left side of the valve housing 1 according to the figure, and which communicates with the boring 14 in the housing 1, for movement of the slave activator in one direction, the valve should not cause any flow of fluid to the reservoir via the radial borings 4,5 in the housing 1. Since A is smaller than 2×B, due to the pressure increase the second slide valve 22 can hereby be moved to abut against the second shoulder 18 without the rod's end sections 41,42 abutting against the adjacent valve bodies 31,32 simultaneously. Thus none of the valve bodies will be moved away from their seats and no fluid in the circuits will be able to flow to the reservoir.

The same applies if the pressure in only the first, right circuit is increased during operation of the system.

If the system is left with the master activator's operational lever, such as a gear lever, in, e.g., a neutral position and the temperature of the fluid in the system increases, thus causing the pressure of the fluid in the hydraulic system's circuits to increase, in theory both slide valves 21,22 will be moved towards the housing's central section simultaneously against the force which is exerted by the third spring 39, since the circuits are separated only by means of freely movable activator parts, such as pistons. In the event of a sufficiently great increase in pressure, the end sections 41,42 of the rod 40 will abut against the respective adjacent valve bodies 31,32, whereupon a continued increase in the pressure in the circuits results in simultaneous movement of both valve bodies away from their seats, and fluid from both circuits can flow to the reservoir while at the same time the pressure is lowered in both circuits. In this theoretical ideal situation, therefore, the lever will be able to remain at rest in the neutral position.

In practice, however, the friction, e.g., between the slide valves 21,22 and the related boring sections 11,12 will probably be unequal. Moreover there will be friction between the activator pistons and the cylinder parts of the master and slave cylinders in addition to which the two circuit s can be heated to different degrees. This means that it will be possible for a difference to arise in the pressures in the two circuits during a rise in temperature.

Thus the situation could arise, e.g., that only the second slide valve 22 is moved initially since the pressure in the second circuit is greater than the pressure in the first circuit. For example the second valve body 32 can then abut against the second end 42 of the rod 40 and take it with it towards the right in the figure. Since A is smaller than 2×B, however, the second slide valve 22 can be moved all the way to abut against the second shoulder 18 without the first end 41 of the rod 40 abutting against the first valve body 31.

When the pressure of the fluid in the first, right circuit has also become sufficiently great, the first slide valve 21 is moved to the left until the first valve body 31 abuts against the right end 41 of the now stationary rod 40. When the second slide valve 22 abuts against the second shoulder 18 and the first slide valve 21 has not yet come into abutment against the first shoulder 17, the second compression spring 38 has been expanded more than the first compression spring 37, and the force which is exerted by the second compression spring 38 is then less than the force which is exerted by the first compression spring 37. If the first slide valve 21 continues to move to the left in the figure, the rod 40 will therefore only cause the second valve body 32 to move away from its seat. Thus only the pressure of the fluid in the second, left circuit will initially be reduced, which is advantageous since the fluid pressure is greatest in this circuit.

As a consequence of the pressure drop in the second, left circuit, and the reduced force which is exerted by the fluid on the second slide valve 22, this slide valve 22 will be moved to the left in the figure until the seat or the shoulder 29 abuts against the second valve body 32. If the movement of the first slide valve 21 to the left continues, the rod 40 will cause the first valve body 31 to move away from its seat, whereupon the pressure of the fluid in the first circuit is reduced.

As a consequence of hysteresis in the system due to the above-mentioned friction, but also by means of a suitable choice of valve parameters such as the distances A and B, the characteristics and dimensions of the springs, tests have thereby demonstrated that a repeated forward and backward movement of the slide valves 21,22 and the rod 40 and a gradual pressure reduction in the two circuits can be achieved. As a result thereof the operational body for the system's master activator, e.g. a gear lever, will first be moved a distance in one direction away from its neutral position and then be moved a shorter distance in the other direction, passing the neutral position etc. until the pressure in the system's circuits has been reduced to such an extent that both valve bodies abut against their seats. Thus the gear lever is finally located only a very short distance from the original neutral position. An operator will therefore be able to ascertain that the operating lever for the double-acting hydraulic system has only been moved a very short distance away from its neutral position as a result of the pressure reduction, and that it is easily moved.

Even though it has been stated in the above that the fluid in the system is a hydraulic fluid, it should be understood that the fluid can instead be a gas if this should be advantageous.

Furthermore it should be understood that the two slide valves can extend at an angle in relation to each other and that the rod 40 can then be replaced by, e.g., a suitable mechanism or the like. Nor do the dimensions of the slide valves need to be the same nor the valve substantially symmetrical, as illustrated in the figure.

I claim:

1. A pressure reduction valve for reducing the pressure in the circuits of double-acting, closed hydraulic systems with a slave activator and a master activator, when the master activator is unattended, comprising a valve housing (1) which contains a first seat (28) which defines two spaces (24,26), wherein the first space (24) is arranged to communicate with the first circuit and the second space (26) is arranged to communicate with a reservoir for the hydraulic fluid, in the first space (24) there is provided a first valve body (31) and a first spring (37), one end of which abuts against a section of the housing (1) and the second end of which abuts against the valve body (31), and the valve body (31) is arranged to be moved in one direction to sealingly abut against the seat (28) under the influence of the force which is exerted by the pressure of the fluid in the first circuit, and the force of the first spring (37), and in an opposite direction under the influence of an opening body section (41) which in turn is influenced by the pressure of the fluid in the second circuit, characterized in that the first seat (28) constitutes a section of a slide valve (21) which is sealingly provided in a boring (6) in the housing (1), and which is arranged to slide in the valve body's direction of movement, and to be influenced by the first spring (37) via the valve body (31) when it abuts against its seat, and that the above-mentioned components in the housing (1) of the reduction valve constitute a first valve device, and in the housing (1) there is provided a second, similar valve device, whose valve body (32) is arranged to be moved in one direction to abut against its seat (29) under the influence of the force which is exerted by the pressure of the fluid of the second hydraulic circuit and the force which is exerted by a second spring (38), and in an opposite direction under the influence of an opening body section (42) which in turn is influenced by the pressure of the fluid in the first circuit, the valve devices' opening body sections (41,42) being interconnected, and the slide valves (21,22) are influenced by a spring device (39) which attempts to move the slide valves (21,22) in the respective valve bodies' (31,32) opening directions in the housing (1).

2. A pressure reduction valve according to claim 1, characterized in that the slide valves (21,22) extend coaxially to each other and are movable in this axial direction in the housing (1), and the opening body sections (41,42) are sections of a rectilinear rod (40).

3. A pressure reduction valve according to claim 1 or 2, characterized in that the total possible distance of movement (2×B) for the opening body (40) between the valve bodies (31,32) in their closed state, is greater than the possible distance of movement (A) for each of the slide valves (21,22), but less than the total distance of movement (2×A) for the slide valves (21,22).

* * * * *